United States Patent Office 3,222,382
Patented Dec. 7, 1965

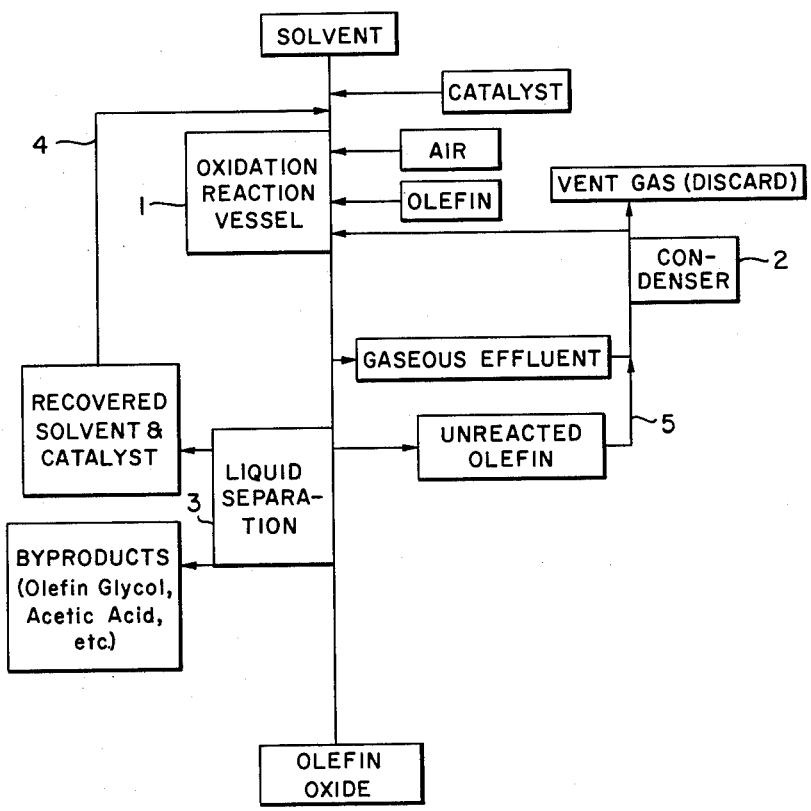

3,222,382
EPOXIDATION
Raymond Lanthier, Shawinigan, Quebec, Canada, assignor to Shawinigan Chemicals Limited, Montreal, Quebec, Canada, a corporation of Canada
Filed Mar. 14, 1963, Ser. No. 265,294
8 Claims. (Cl. 260—348.5)

This invention relates to the production of epoxides by the catalytic oxidation of monoolefins and more particularly to the production of alkylene oxides from the corresponding monoolefins in a liquid medium which contains at least one at least partially water miscible solvent for the olefin. This application is a continuation-in-part of my copending application Serial Number 241,254 filed November 30, 1962, now abandoned.

It is well-known in the art that alkylene oxides can be prepared by direct oxidation of olefins with an oxygen-containing gas in a liquid phase at elevated temperatures and pressures. One such process is described, for example, in U. S. Patent 2,784,202.

Hitherto the main drawback of all such processes was the difficulty experienced in preventing deterioration of the alkylene oxide when produced under conditions conducive to satisfactory theoretical yields. Lower olefin oxides are highly reactive and hence easily hydrolyzed, decomposed, or polymerized. Many arrangements were proposed to circumvent this difficulty, including removal of one or more components from process recycle streams, addition of polymerization inhibitors, simulation of reaction product composition in the liquid organic solvent for the olefin, and others. In particular the use of water-immiscible organic solvents was held to be essential.

It has now been found that a new and improved process of producing alkylene oxides by oxidation in a liquid solvent from the corresponding olefins ensures consistently high yields without using many of the previous process requirements, this simplification being made possible by employing an organic liquid solvent comprising at least one at least partially water miscible component of the group consisting of acetone, methyl ethyl ketone and tertiary butyl alcohol as the liquid medium. This at least partially water miscible solvent is employed in admixture with other solvents of the group consisting of benzene, monochlorobenzene and dichlorobenzene in a ratio as illustrated in the following examples of between 4:1 and 1:4 by volume.

The present invention thus consists of a process for the production of an alkylene oxide from the corresponding monoolefin by direct catalytic oxidation, which comprises (1) passing a stream of oxygen-containing gas through a liquid medium containing an organic solvent for the olefin and an oxidation catalyst soluble in said solvent, said solvent comprising at least one at least partially water miscible component, (2) passing an olefin into the liquid medium to react with the oxygen-containing gas stream, (3) withdrawing liquid from the resulting reaction mixture and (4) recovering olefin oxide, other reaction products, unreacted olefin and solvent therefrom.

In the practice of the present invention the temperature and pressure in the reactor can be varied within a fairly wide range, depending on the feed rates and like design considerations and/or the substances employed. Even atmospheric pressure can be employed, but the rate of reaction is correspondingly low. The catalyst can be selected from among the number of usual oxidation catalysts for such reactions, preferably, for example, cobalt or manganese compounds. The reaction is initiated at various temperatures depending on the conditions in which free radicals are formed by the catalyst. If propylene is used as the starting olefin and the catalyst is a bromate, for example, a temperature of 130° C. is sufficient, whereas a corresponding caprylate requires at least 145° C. The rate of formation of byproducts also varies. For highest yields of propylene oxide by the present process, a range of 145°–165° C. is most favourable.

By utilizing the process of the present invention it is possible to eliminate such prior art requirements as the addition of hydrocarbons to the feed, the recycling of reaction products, the simulation of product compositions in the starting mixture, the addition of polymerization inhibitors and the like, thus providing new and significant overall economies. It is to be understood that although the process is described with reference to only a few particular embodiments thereof, and especially the oxidation of propylene in a solution of chlorobenzene and acetone, this by no means limits the invention to the particular substances mentioned in the description. The present invention can be operated in both a batch and a continuous manner, the latter being preferred for best results.

A nonlimiting example of the invention is described below. For a fuller understanding of same, recourse can be had to the accompanying flowsheet showing the flow of ingredients through various stages of the process involved in the invention, including optional expedients. On this flowsheet, 1 designates the reactor, 2 the condenser system with its attendant controls, 3 the separation and recovery system, 4 the solvent recycle system, and 5 the system for the recycle of condensables to the reactor. The operation using propylene as the olefin is as follows. An initial portion of solvent containing catalyst is charged to the reaction vessel. A stream of air containing oxygen in appropriate proportion is then fed to the reactor to establish reaction conditions therein. Liquid propylene is charged to a tank equipped with pumps and control valves to provide a controlled rate of feed to the reactor 1, and a stream of propylene feed is started. The reactor optionally can be coupled to an auxiliary container to which the liquid products can be transferred to produce a sudden stop in the reaction. The gases evolved in the reactor are condensed in a cooling system 2 and liquid low boilers therefrom, essentially propylene, are recycled to the feed tank, higher-boiling substances being returned to the reactor. Noncondensable gases are released by a back pressure regulator to a control system equipped with analyzers to determine $O_2$, $N_2$, $CO$, $CO_2$ and propylene contents. The liquid in the reactor is withdrawn continuously to a separation and solvent recovery system 3. Alternately, the liquid can be withdrawn only at intervals or at the end of the reaction if semicontinuous or batch operation is desired. Products and waste are separated from the withdrawn liquid, and stripped solvent containing catalyst is recycled to the reactor 4. Makeup solvent and fresh catalyst can be added as required. Propylene is recycled to the condenser system 5.

Example I

In this example, in an apparatus described as above, 400 ml. solvent consisting of 80% by volume chlorobenzene and 20% by volume acetone along with 40 parts cobalt, in the form of cobalt (2) caprylate, a solid soluble in the slovent, per one million parts by weight of solvent was charged to an evacuated reactor of 2 litre capacity equipped with a stirrer. Air with an oxygen content reduced to 15% by volume was charged to the reactor to bring the pressure to 600 p.s.i. The air feed was then cut off and the reactor heated heated while stirring. The condenser system was provided with a back-pressure valve to maintain pressure in the reactor at 700 p.s.i. As the reactor temperature reached 50° C. liquid propylene was pumped into the reactor at a rate of three ml. per minute while heating and stirring continued. At about 120°, the pressure in the reactor reached 700 p.s.i., and a stream of gas started to evolve from the system at a rate of two liters per min. which decreased slowly down to one liter per min. Air feed was then resumed with an oxygen content of 15% by volume and was adjusted to keep the off-gas vented at a rate of one liter per min. The off-gas was analyzed and as its oxygen content dropped to 15% by volume, the air feed was changed to the natural oxygen content of about 21%. The heating was stopped when the reactor temperature reached 150° C. and this temperature was then maintained throughout the reaction.

As the reaction continued, the oxygen-content of the off-gas dropped. When this oxygen content reached 4–5% by volume, liquid was drawn off from the reactor at a rate of 7.2 ml. per minute and simultaneously new solvent-catalyst feed from the recycle system was added to the reactor at a rate of six ml. per minute.

The gases coming off the reactor were stripped of propylene and higher boiling point materials in the condenser system and all condensable materials were recycled to the reactor. The withdrawn liquid was separated by the usual well-known techniques in a separation system. Propylene oxide, acetic acid and propylene glycol, as well as the solvent, were recovered separately, and other waste was discarded; the solvent and the propylene were recycled. After 285 min. the run was stopped and results evaluated by analytical methods.

Of every 128 gms. propylene fed into the system, 100 gms. were converted to reaction products. The total propylene oxide yield was 86.2 gms., corresponding to a yield of 62.4% calculated on propylene converted.

Example II

In this example the same apparatus was used as in Ex. I, but 400 ml. solvent, consisting of 60% by volume benzene and 40% by volume acetone was charged to the reactor along with 40 parts per million cobalt (2) caprylate. The reactor was pressurized to 700 p.s.i.g. in the same manner as described in Ex. I, except that oxygen content was held to 10% volume. As the reactor temperature reached 50° C., liquid alpha-methylstyrene was pumped into the reaction at a rate of four ml. per minute while heating and stirring continued. At about 130° C. a stream of gas started to evolve from the system at a rate of 1.5 liters per min. which decreased slowly to one liter per min. Air feed was then resumed with oxygen content of 10% by volume and was adjusted to keep the off-gas vented at a rate of one liter per min. The off-gas was analyzed and when its oxygen content dropped to 8% by volume the air feed was switched to the natural oxygen content of 21%. The heating was stopped when the reactor temperature reached 150° C. and this temperature was then maintained throughout the reaction.

The gases evolving from the reactor were stripped of unreacted alpha-methylstyrene and other condensables in the condenser system and recycled to the reactor with makeup fresh feed. After 180 minutes the reaction was stopped and the 580 ml. of liquid remaining in the reactor was analyzed. Concentrations of 3.1% epoxide as alpha-methylstyrene epoxide, 0.0129 acid equivalent per 100 ml. and 8.82% weight by volume nonvolatile residue (polymer) were found in the liquid products.

Example III

In this example the same apparatus was used as in Ex. I, but 400 ml. solvent, consisting of 20% by volume benzene and 80% by volume acetone, was charged to the reactor along with 40 parts per million cobalt by weight of solvent, the cobalt being in the form of cobalt (2) caprylate. The reactor was pressurized to 700 p.s.i.g. with air containing 15% by volume of oxygen in the same manner as described in Ex. I. As the reactor temperature reached 50° C. liquid propylene was pumped into the reactor at a rate of four ml. per minute while heating and stirring continued. At about 130° C. a stream of gas started to evolve from the system at a rate of 1.5 liters per min. which decreased slowly to one liter per min. Air feed was then resumed with an oxygen content of 15% by volume and was adjusted to keep the off-gas vented at a rate of one liter per min. The off-gas was analyzed and when its oxygen content dropped to 13% by volume the air feed was switched to the natural oxygen content of 21%. The heating was stopped when the reactor temperature reached 150° C. and this temperature was then maintained throughout the reaction.

As the reaction continued the oxygen content of the off-gas gradually dropped. When the oxygen content reached four percent by volume, liquid was withdrawn at a rate of 4.4 ml. per minute from the reactor and simultaneously makeup solvent-catalyst feed was added to the reactor at a rate of four ml. per minute.

The gases evolving from the reactor were stripped of unreacted propylene and other condensables in the condenser system and these were recycled to the reactor with makeup fresh feed. The withdrawn liquids were separated by the usual well-known techniques in a separation system.

Propylene oxide, acetic acid, methyl ethyl ketone, acetaldehyde, as well as solvent were recovered from the withdrawn liquid separately, and waste discarded. The solvent and propylene were recycled. After 720 minutes the run was stopped and the yields evaluated by analytical methods.

Of every 100 gms. propylene fed to the system, 20 gms. were converted to reaction products. The total propylene oxide yield was 12.2 gms., corresponding to a yield of 61% calculated on propylene converted. A material balance on propylene converted gave the following yields, based on carbon converted, for identifiable main byproducts:

| | Percent |
|---|---|
| Carbon dioxide | 5.5 |
| Carbon monoxide | 4.5 |
| Acetic acid | 4.1 |
| Methyl formate | 2.5 |
| Methyl ethyl ketone | 5.6 |
| Acetaldehyde | 3.1 |
| Methanol | 3.7 |
| Propylene glycol acetate | 1.3 |
| Propylene glycol | 1.3 |
| Miscellaneous | 7.4 |
| Total byproducts | 39. |

Example IV

In this example the same apparatus was used as in Ex. I, but a mixture of alpha-olefins obtained from ethylene polymerization was used as a feedstock. It contained predominantly C–8 olefins, i.e. olefins containing eight carbon atoms. 400 ml. solvent, consisting of 60% by volume benzene and 40% by volume acetone was charged to the reactor along with 40 parts per million cobalt by weight of solvent, the cobalt being in the form of cobalt (2) caprylate. The reactor was pressurized to 700 p.s.i.g. in the same manner as described in Ex. I, but oxygen concentration was held to 10% by volume. As the reactor temperature reached 50° C., liquid olefins were pumped into the reactor at a rate of four ml. per minute while heating and stirring continued. At about 135° C. a stream of gas started to evolve from the system at a rate of 1.5 liters per min. which decreased slowly to one liter per min. Air feed was then resumed with an oxygen content of 10% by volume and was adjusted to keep the off-gas vented at a rate of one liter per min. The off-gas was analyzed and when its oxygen content dropped to 8% by volume the air feed was switched to the natural oxygen content of 21%. The heating was stopped when the reactor temperature reached 150° C. and this temperature was then maintained throughout the reaction.

The gases evolving from the reactor were stripped of unreacted olefins and other condensables in the condenser system and these were recycled to the reactor with makeup fresh feed. The 585 ml. of product liquid was analyzed by the usual well-known techniques when the run was stopped after 180 minutes of operation. A concentration of 6.4% epoxides calculated as epoxide of C–8 olefin, 0.0437 acid equivalents per 100 ml., and 11.1% weight by volume nonvolatile residue (polymers) were found in the product liquid.

Example V

In this example the same apparatus was used as in Ex. I; 400 ml. solvent, consisting of 60% by volume benzene and 40% by volume acetone was charged to the reactor along with 40 parts per million cobalt by weight of solvent, the cobalt being in the form of cobalt (2) caprylate. The reactor was pressurized to 700 p.s.i.g. in the same manner as described in Ex. I. As the reactor temperature reached 50° C., liquid butene-1 was pumped into the reactor at a rate of six ml. per minute while heating and stirring continued. At about 130° C. a stream of gas started to evolve from the system at a rate of 1.5 liters per min. which decreased slowly to one liter per min. Air feed was then resumed with an oxygen content of 15% by volume and was adjusted to keep the off-gas vented at a rate of one liter per min. The off-gas was analyzed and when its oxygen content dropped to 13% by volume the air feed was switched to the natural oxygen content of 21%. The heating was stopped when the reactor temperature reached 150° C. and this temperature was then maintained throughout the reaction.

The bases evolving from the reactor were stripped of unreacted butene-1 and other condensables in the condenser system and these were recycled to the reactor with makeup fresh feed. 510 ml. of liquid were recovered at the end of the reaction, which was stopped after 180 minutes. Upon analysis a concentration of 3.5% butene oxide was found in the withdrawn liquid.

Example VI

In this example the same apparatus was used as in Ex. I and 400 ml. solvent, consisting of 80% by volume chlorobenzene and 20% by volume methyl ethyl ketone was charged to the reactor along with 40 parts per million cobalt by weight of solvent, the cobalt being in the form of cobalt (2) caprylate. The reactor was pressurized to 700 p.s.i.g. in the same manner as described in Ex. I. As the reactor temperature reached 50° C. liquid propylene was pumped into the reactor at a rate of four ml. per minute while heating and stirring continued. At about 130° C. a stream of gas started to evolve from the system at a rate of 1.5 liters per min. which decreased slowly to one liter per min. Air feed was then resumed with an oxygen content of 15% by volume and was adjusted to keep the off-gas vented at a rate of one liter per min. The off-gas was analyzed and when its oxygen content dropped to 13% by volume the air feed was switched to the natural oxygen content of 21%. The heating was stopped when the reactor temperature reached 150° C. and this temperature was then maintained throughout the reaction.

The gases evolving from the reactor were stripped of unreacted propylene and other condensables in the condenser system and these were recycled to the reactor with makeup fresh feed. 480 ml. of product liquids were separated by the usual well-known techniques in a separation system at the end of the run, which lasted 170 minutes. Propylene oxide, acetic acid, glycols, as well as solvent were recovered separately and waste discarded.

Of every 100 gms. propylene fed to the system, 11.7 gms. were converted to reaction products. The total propylene oxide yield was 4.6 gms., corresponding to a yield of 39.5% calculated on propylene converted. A material balance on propylene converted gave the following yields, based on carbon converted, for identified main byproducts: 14.4% $CO_2$, 6.6% $CO$, 15.1% acetic acid, 2.2% methyl formate, 5.2% propylene glycol acetate, 4% propylene glycol, and 13.5% miscellaneous byproducts.

Example VII

In this example the same apparatus was used as in Ex. I. 400 ml. solvent, consisting of 50% by volume benzene and 50% by volume tertiary butyl alcohol was charged to the reactor along with 40 parts per million cobalt by weight of solvent, the cobalt being in the form of cobalt (2) caprylate. The reactor was pressurized to 700 p.s.i.g. in the same manner as described in Example I. As the reactor temperature reached 50° C., liquid propylene was pumped into the reactor at a rate of four ml. per minute while heating and stirring continued. At about 130° C. a stream of gas started to evolve from the system at a rate of 1.5 liter per min. which slowly decreased to one liter per min. Air feed was then resumed with oxygen content of 15% by volume and was adjusted to keep the off-gas vented at a rate of one liter per min. The off-gas was analyzed and when its oxygen content dropped to 13% by volume the air feed was switched to the natural oxygen content of about 21%. The heating was stopped when the reactor temperature reached 150° C and this temperature was then maintained throughout the reaction.

The gases evolving from the reactor were stripped of unreacted propylene and other condensables in a condenser system and these were recycled to the reactor with fresh makeup feed. The reaction was stopped after 180 min. and the total liquid product, 417 ml., was analyzed by the usual analytical methods. Propylene oxide concentration was 3.5%.

Of every 100 gms. propylene fed into the system, 8.2 gms. were converted to reaction products, the total propylene oxide yield being 3.2 gms., which corresponds to a yield of 38.7% calculated on propylene converted. Other product concentrations were: 0.9% methanol, 0.4% formaldehyde, 1.0% methyl ethyl ketone, 0.9% acetic acid, 1.0% propylene glycol formate and 0.6% propylene glycol.

While some specific examples of the practice of the present invention have been described, it is clear that many modifications may be made therein without departing from the scope of the invention. For instance any mono ethylenically unsaturated olefin may be used, provided only that it is soluble in the liquid medium under the reaction conditions. The water-immiscible solvent need not be chlorobenzene or benzene, but could be replaced by others inert with respect to the other ingredients, such a dischlorobenzene, or mixtures thereof. Promoters like tetrabromoethane or N-bromosuccinimide can be added and other well-known salts of cobalt or manganese can be used as oxidation catalysts, subject only to design considerations. Flow rates can also be subject to wide variations.

The entirely new and unexpected advantages of the process of the present invention can be seen from the following table comparing previous processes for the epoxidation olefins with test runs of the present invention, designated as runs 602, 601, and 600:

| Examples | Yield in grams per 100 gms. Propylene Converted | | Mole Ratio of Oxide to Glycol |
|---|---|---|---|
| | Propylene Oxide | Propylene Glycol | |
| n 602 | 75.8 | 5.2 | 19.1 |
| 601 | 77.6 | 4.3 | 23.7 |
| 600 | 86.2 | 5.4 | 20.9 |
| | 39.8 | 22.9 | 2.28 |
| | 44.75 | 21.1 | 2.56 |
| | 29.8 | 30.3 | 1.29 |
| | 36.0 | 16.9 | 2.88 |
| | 55.2 | 36.1 | 2.79 |
| | 12.8 | 6.2 | 2.72 |

The prior art results numbered 1–6 above are taken from examples of the processes hitherto considered best. Runs 1–3 are from U.S.P. 2,780,634, run 4 is from U.S.P. '80,635, run 5 is from U.S.P. 2,784,202 and run 6 is from U.S.P. 2,824,119. These patents all show processes of epoxidation of olefins with air.

The table above indicates the extent of the repression of product formation obtained by the use of a process employing an at least partially water-miscible organic solvent.

The ratio shown in the last column is the ratio of yields of the desired product (propylene oxide) and the undesired byproduct (propylene glycol). It will be noted that the ratios obtained in the process of the present invention are seven to eighteen times as high as the ratios obtained in the prior art processes.

The foregoing table illustrates that the use of a solvent that is at least partially water-miscible offers hitherto unknown and unexpected advantages in the process of preparing olefin oxides from olefins by direct oxidation in the presence of a liquid medium.

It is to be understood that the invention is not limited to the specific embodiments of same used in describing it but that many modifications thereof may be made by persons skilled in the art, without departing from its scope.

What is claimed is:

1. The process for the production of an olefin oxide of the group consisting of the epoxides of monoolefinic hydrocarbons containing from three to eight carbon atoms and alpha-methylstyrene epoxide by direct catalytic oxidation of the corresponding monoolefinic hydrocarbon which comprises (1) passing a stream of the corresponding monoolefinic hydrocarbon into a liquid solvent medium consisting essentially of a first component selected from the group consisting of benzene, monochlorobenzene and dichlorobenzene and a second component of the group consisting of acetone, methyl ethyl ketone, and tertiary butyl alcohol, the proportions of said first and second components in said solvent medium being in the range between 4:1 and 1:4 by volume, said medium containing a catalyst selected from the group consisting of cobalt and manganese oxidation catalysts dissolved therein, (2) simultaneously passing a stream of gas containing free oxygen through the solvent medium to react with the monoolefinic hydrocarbon, (3) with drawing liquid from the resulting reaction mixture, and (4) recovering olefin oxide from the withdrawn liquid.

2. A process according to claim 1 wherein the catalyst is a cobalt oxidation catalyst.

3. A process according to claim 2 wherein the monoolefinic hydrocarbon is propylene.

4. A process according to claim 1 including the additional step of recycling to the reaction mixture unreacted olefin and solvent from the withdrawn liquid.

5. A process according to claim 4 in which the solvent medium is a mixture of benzene and acetone.

6. A process according to claim 4 in which the temperature is in the range of 145 to 165° C.

7. A process according to claim 6 in which the pressure is maintained at 700 p.s.i.

8. A process according to claim 7 in which the gas containing free oxygen is air.

References Cited by the Examiner

UNITED STATES PATENTS

| | | | |
|---|---|---|---|
| 2,316,604 | 4/1943 | Loder et al. | 260—348.5 |
| 2,585,479 | 2/1952 | Levy | 260—348.5 |
| 2,644,837 | 7/1953 | Schweitzer | 260—348.5 |
| 2,741,623 | 4/1956 | Millidge et al. | 260—348.5 |
| 2,784,202 | 3/1957 | Gardner et al. | 260—348.5 |
| 2,824,142 | 2/1958 | Gardner et al. | 260—348.5 |
| 2,985,668 | 5/1961 | Shingu | 260—348.5 |

FOREIGN PATENTS

| | | |
|---|---|---|
| 786,301 | 11/1957 | Great Briitain. |
| 886,164 | 1/1962 | Great Britain. |

WALTER A. MODANCE, *Primary Examiner.*

NICHOLAS S. RIZZO, *Examiner.*